United States Patent [19]

Simon et al.

[11] 3,928,732

[45] Dec. 23, 1975

[54] EXTENSION AND LINE INDICATING DISPLAY SYSTEM FOR KEY TELEPHONE SYSTEM

[75] Inventors: William F. Simon, Duluth, Minn.; William C. Torrey, Superior, Wis.

[73] Assignee: Telephone Associates, Inc., Superior, Wis.

[22] Filed: Nov. 19, 1973

[21] Appl. No.: 416,849

[52] U.S. Cl. .............. 179/99; 179/84 L; 179/27 FC

[51] Int. Cl.$^2$ .......................................... H04M 1/21

[58] Field of Search..... 179/99, 90 AW, 5.5, 18 FH, 179/27 DB, 27 FC, 27 FF, 37, 84 R, 89 L, 27 F, 18 AD, 18 BA, 18 BG, 18 BD

[56] References Cited

UNITED STATES PATENTS

| | | | |
|---|---|---|---|
| 3,453,396 | 7/1969 | Lacey et al. | 179/99 |
| 3,636,319 | 1/1972 | Nixon | 179/90 AN |
| 3,727,003 | 4/1973 | Paraskevakos | 179/5.5 |
| 3,812,296 | 5/1974 | Paraskevakos | 179/5.5 |

*Primary Examiner*—Kathleen H. Claffy
*Assistant Examiner*—Gerald L. Brigance
*Attorney, Agent, or Firm*—Merchant, Gould, Smith, Edell, Welter & Schmidt

[57] ABSTRACT

A telephone call handling system for use with key telephone systems, including means for displaying at a called extension the identification number of the line on which the incoming call is received. A receptionist enters extension and line identification data by means of a key pad or dial, thereby causing corresponding electrical signals to be generated. An address network responds to the extension identification signal to transmit the line identification signal to the called extension. A digital display at the called extension indicates the line on which the incoming call is received, and a buzzer produces an audible signal at the called extension, in response to received line identification data.

12 Claims, 4 Drawing Figures

EXTENSION AND LINE INDICATING DISPLAY SYSTEM FOR KEY TELEPHONE SYSTEM

BACKGROUND OF THE INVENTION

The present invention pertains generally to the field of telephone call handling systems, and more particularly to call handling systems for use with key telephone systems.

Key telephone systems are widely used throughout the country for installations in which the telephone subscriber requires the use of more than one telephone company central office line, where each line may be accessed by any of a number of extension phones in the system. In usual situations, the key telephone system may have from 3 to 15 central office lines, and perhaps anywhere from 10 to 25 telephone instruments, or extensions, each of which has access to each of the central office lines through depressing an individual button on the telephone instrument corresponding to a particular central office line. In this respect, key telephone systems may be distinguished from PBX systems which are generally used in much larger installations, wherein each user instrument is connectable to the central office lines only through a switchboard, rather than through depressing corresponding keys at the instrument.

In normal operation, a key telephone system operates as follows. When an incoming call is received, the person answering the call (receptionist) observes the buttons on the telephone instrument to determine which one is flashing, indicating which line the incoming call is on. After depressing the flashing button and answering the call, it is usually necessary to inform the person that the call is for (the called party) (1) that there is a telephone call for him, and (2) which of the central telephone company lines the call is on. In the most usual key telephone systems, the receptionist pushes the incoming call on hold, then depresses another key on the telephone instrument which gains access to a common intercom line permitting the receptionist to call the appropriate extension via the intercom and inform the called party of which line to answer. Upon receipt of the intercom call, the called party depresses the intercom button and receives the information as to which line the call for him is on.

The above described method of answering and handling incoming telephone calls in a key telephone system via an intercommunicating line operated by a button on each telephone instrument within the system is very slow and cumbersone, particularly in installations involving a large number of central office lines and extensions. Accordingly, it is an object of the present invention to greatly improve the speed, efficiency and transfer capabilities in a key telephone system by eliminating the need for verbal communication between the receptionist and the called party. According to the present invention, the receptionist, upon answering an incoming call, merely enters several digits into an input device, which may be a digital key pad or a telephone dial, depending upon which embodiment is used. This causes an audible signal and a visual readout to light at the called party's extension, thus indicating which line the incoming call is on. For example, if the incoming call is on line No. 4, and the call is for the party at extension No. 12, the receptionist would merely enter the digits 1-2-4. An audible signal would then be triggered at extension 12, and the digit 4 would be displayed in the readout at that extension, indicating that there is a call for the called party on line No. 4. Meanwhile, the receptionist, after having placed the incoming call on hold and entering the extension and line indicating numbers into the input device, is free to handle other incoming calls or other matters.

SUMMARY OF THE INVENTION

Thus according to the present invention the efficiency of handling incoming telephone calls in a key telephone system is improved through elimination of the need for verbal intercommunication between the receptionist and the called party. According to the present invention there is provided a device for the entry of data by the receptionist signifying the called party's extension and the line on which the call is received. The input device may be a telephone digital keyboard or a dial, and it may be a separate device associated with the telephone instrument, or, by suitable switching arrangements, can be the same telephone keyboard or dial that is used in conjunction with the central office lines. A signal generator connected to the input device produces extension identification signals and line identification signals in response to the entry of data by the receptionist. Transmission means including an address network responds to the extension identification signal to transmit the line identification signal to the appropriate remote extension telephone instrument. A display or readout associated with the extension receives the line identification signal and displays the number or other symbol corresponding to the line on which the incoming call is received. An audible signaling device associated with the display means provides an audible signal upon receipt of the line identification signal, to alert the called party of the incoming call. Readouts may also be provided at the receptionist's extension for visual confirmation of the extension and line identification numbers entered.

BRIEF DESCRIPTION OF THE PREFERRED EMBODIMENT

Figure 1:
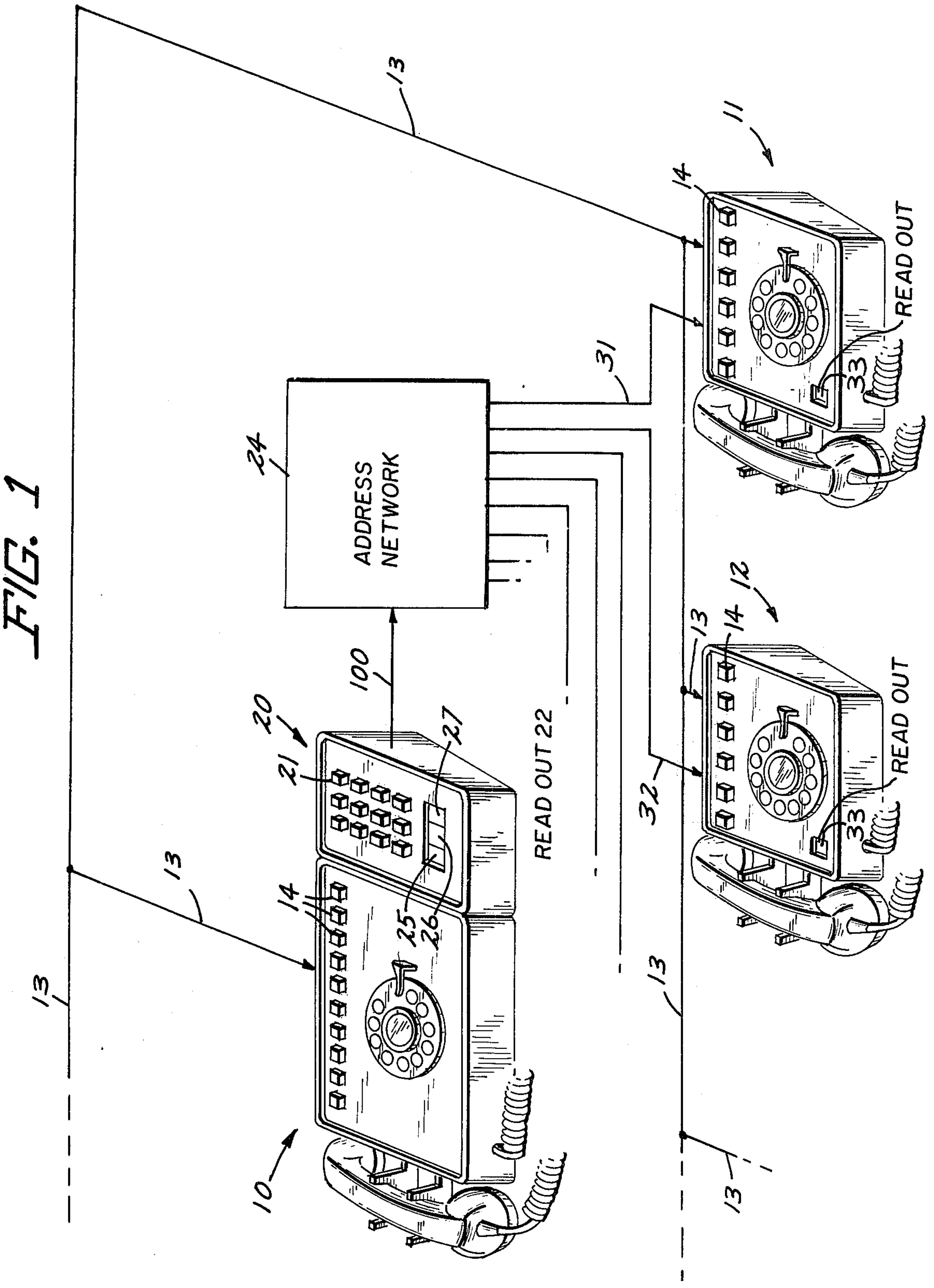
FIG. 1 is a pictorial diagram illustrating a telephone system incorporating the present invention.

In the key telephone system of FIG. 1, reference numeral 10 generally designates the multi-line telephone instrument for use at the receptionist's station. Similarly, reference numerals 11 and 12 designate remote extensions of the system. Reference numeral 13 indicates the plurality of telephone company central office lines, which are connected in parallel to each of the telephone instruments. As previously mentioned, cable 13 may contain any number of individual lines, depending upon the requirements of the particular installation. Each of the telephone instruments has a plurality of keys, designated by reference numeral 14. On each instrument, one key is of course the hold button, and each remaining key corresponds to one of the central office lines. Depressing one of the keys connects the instrument to the corresponding central office line, for purposes of receiving an incoming call or placing an outgoing call.

Attached to the receptionist's instrument 10 is an auxiliary key pad 20. Reference numeral 21 designates the buttons on the face of the auxiliary pad, for entry of the digits 0-9 plus a clear button, plus a spare which may be used for special functions if desired. Also mounted on the face of auxiliary key pad 20 is a three digit readout 22. Readouts 22 are for display of numbers entered on keys 21 by the receptionist, corresponding to the identification numbers of the called party's extension and the line on which the incoming call is received. Auxiliary key pad 20 contains pulse generating circuitry for producing extension and line identification signals corresponding to the data entered by the receiptionist via buttons 21. The extension and line numbers are displayed by readouts 22 for confirmation by the receptionist, and are transmitted as indicated by lead 23 to the address network 24. Address network 24 is connected to each of the remote extensions through an appropriate lead. For example, addressing network 24 connects to extension 11 via lead 31, to extension 12 via lead 32, and so on for as many extensions as are in the particular system.

Each of the remote extensions contains a digital display 33, which may be mounted in the face of the instrument for convenience. In the preferred embodiment, readouts 33, and also readouts 22 are of the seven segment light emitting diode type, although any other type of display might be used. Also included in each of the remote extensions, but not shown in FIG. 1, is an audible signaling device which emits an audible tone to indicate to the called party that a call is waiting for him.

DETAILED DESCRIPTION OF THE PREFERRED EMBODIMENT

Figure 2:
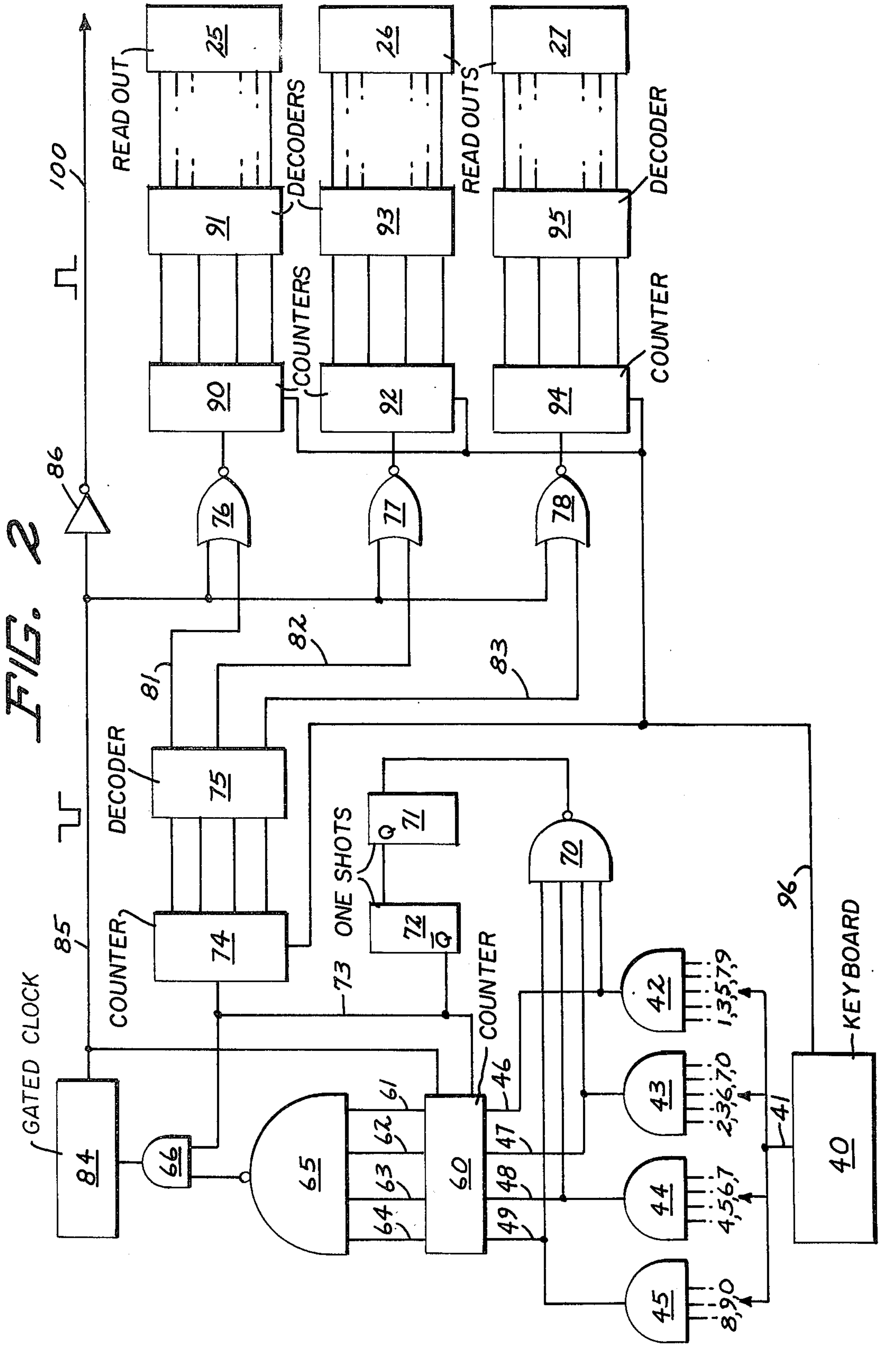
FIG. 2 is a schematic diagram of the data entry and pulse generating circuitry associated with the receptionist's station.
Figure 3:
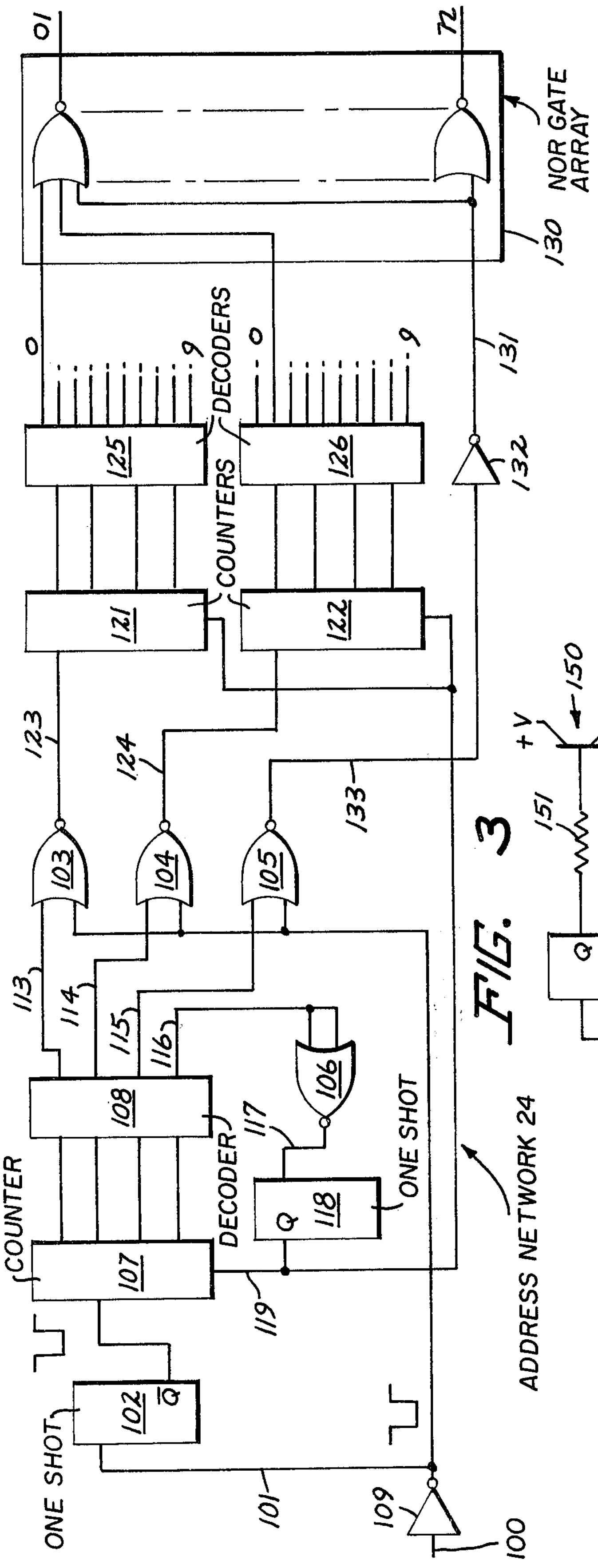
FIG. 3 is a schematic diagram of the addressing network.
Figure 4:
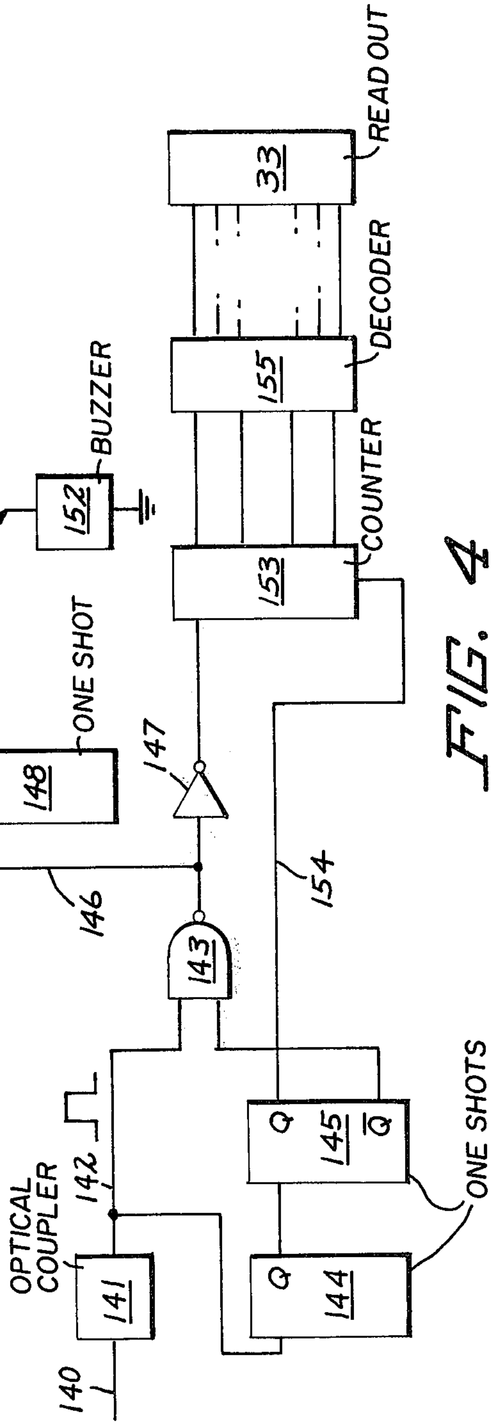
FIG. 4 is a schematic diagram of circuitry associated with each remote extension, according to the present invention.

Reference will now be made to FIGS. 2, 3 and 4, which show in detail the circuits used in the embodiment shown in FIG. 1. Referring specifically to FIG. 2, the pulse generating means for generating extension and line identification signals is shown. In FIG. 2, reference numeral 40 designates a plurality of switches operated by pushbuttons 21 of FIG. 1. These switches are connected via leads 41 to certain ones of the inputs of AND gates 42–45, so as to produce the correct number of pulses according to which of keys 21 of key pad 20 is pushed. In the embodiment shown in FIG. 2, as indicated by lead 41 and the numbers associated in the drawing with the inputs of AND gates 42–45, switches corresponding to the digits 1, 3, 5, 7 and 9 are connected to AND gate 42. Similarly, the switches corresponding to the digits 2, 3, 6, 7 and 0 are applied to the inputs of AND gate 43, digits 4, 5, 6 and 7 are applied to the inputs of AND gate 44, and the digits 8, 9 and 0 are applied to the inputs of AND gate 45. The outputs of AND gates 42–45 are connected via leads 46–49 to digital preset counter 60. The outputs from counter 60 are applied by leads 61–64 to the inputs of NAND gate 65, whose output connects to one input of AND gate 66.

Leads 46–49 also connect to the inputs of NAND gate 70, whose output connects to the input of one-shot circuit 71. The Q output of one-shot 71 connects to the input of one-shot 72, and the $\overline{Q}$ output of one-shot 72 connects by way of lead 73 to preset counter 60, to the other input to AND gate 66 and to the input to counter 74. The outputs of counter 74 connect to decoder matrix 75, which in turn has outputs connected to NOR gates 76, 77 and 78 via leads 81, 82, and 83, respectively.

The output of AND gate 66 connects to gated clock 84, whose output is connected by lead 85 to preset counter 60, inverter 86, and to the remaining inputs of each of NOR gates 76–78.

The output of NOR gate 76 connects to the input of counter 90. The outputs of counter 90 connect to a decoder 91, which in turn connects to digital readout 25. Decoder 90 converts the binary output of counter 90 into the required format to drive the segmented readout 25. In similar manner, the outputs of NOR gates 77 and 78 connect to counters 92 and 94, and the outputs of these counters connect respectively to decoders 93 and 95. Digital readout 26 is connected to decoder 93 and digital readout 27 is connected to decoder 95.

The output of inverter 86 connects to data line 100. A reset line 96 connects from a clear switch in array 40 to the reset inputs of counters 74, 90, 92 and 94.

The operation of the pulse generating means shown in FIG. 2 will now be described. When a call is received, the receptionist first pushes the clear button of keyboard switches 40, thereby clearing the counters and removing from the readouts any numbers previously displayed. The switches in keyboard switches 40 are normally open, so that the inputs to AND gates 42–45 are open-circuited when no buttons are depressed. Open circuit at the inputs of the AND gates corresponds to a logical "1", so that the outputs on leads 46-49 are logical "1's" prior to depressing a button. Thus all the inputs to NAND gate 70 are logical "1," and its output is a logical "0." Upon pressing the first button of keyboard switches 40, inputs to one or more of AND gates 42 to 45 are grounded, according to the manner in which these AND gates are wired to the keyboard switches. This in turn causes one or more of leads 46–49 to switch to logical "0," causing the output of NAND gate 70 to switch to a logical "1". The logical "1" at the output of NAND gate 70 triggers one-shot 71, which in turn triggers one-shot 72. One-shot 71 has a time duration of 5 milliseconds, and its purpose is to prevent multiple triggering which might otherwise be caused by contact bounce in the keyboard switches. The triggering of one-shot 72 generates a load pulse, and is triggered, the $\overline{Q}$ output of one-shot 72 goes to a logical "0," causing preset counter 60 to be preset with the binary number on leads 46-49, which of course is a function of which button in the keyboard was depressed. At the end of the load pulse the signal on lead 73 returns to logical "1" thereby incrementing counter 74 from a count of zero to a count of one, and supplying a logical "1" to one input of AND gate 66.

Prior to the loading of preset counter 60 just described, counter 60 contained a full count of 1111 in binary form, which equals 15 in the decimal system. With four logical "1's" applied to its input, NAND gate 65 was providing a logical "0" to inhibit AND gate 66. When preset counter 60 is preset, the preset number appears at its output on leads 61–64 and since one or more of them will necessarily be logical "0's," NAND gate 65 changes its output to a logical "1." The output of AND gate 66 then switches to a logical "1," enabling the gated clock 84. The gated clock then emits a series of pulses of approximately 1 microsecond duration each, which are fed by lead 85 to the input of counter 60, to the input of the inverter 86, and to the inputs of NOR gates 76–78. Gated clock 84 continues to pulse, with each pulse incrementing preset counter 60 until it reaches a full count of 15. At that point NAND gate 65 switches its output to a logical "0," inhibiting clock 84, and discontinuing the pulse burst.

In the meantime, the count of "1" on counter 74 has caused decoder 75 to put a logical "0" on lead 81 while maintaining a logical "1" on leads 82 and 83. NOR gate 76 is thus enabled to follow the series of pulses on lead 85 and pass them to counter 90, where they are counted, decoded, and displayed at readout 25.

For example, assume that the first button pushed by the receptionist is three. This causes logical "0's" to be applied to the inputs of AND gates 42 and 43, causing logical "0's" to appear at leads 46 and 47. This puts the binary number 1100 on leads 46–49, which is subsequently loaded into counter 60 and appears at leads 61–64, leads 46 and 61 representing the least significant bit, and leads 49 and 64 representing the most significant bit. Specifically, the manner in which inputs are applied to gates 42–45 results in the application of a binary number at the input of counter 60 equal to 15 minus the number of the button pushed. In this case, 15 minus three equals 12, which in binary form is 1100. When counter 60 is preset with the number 12, clock 84 begins pulsing until a full count of 15 is registered in counter 60, thereby producing three pulses. In case the number zero is pushed, the pulse generating circuitry is set up to preset the number five, thereby producing 10 pulses. Ten pulses cause a counter receiving the pulses to count from one through nine and back to zero, so that a zero ends up in the display or register.

When the receptionist depresses a second button of keyboard switches 40, one-shot 72 is again triggered and the binary representation of the second digit is loaded into preset counter 60. At the same time, counter 74 is incremented, resulting in NOR gate 77 being enabled while gates 76 and 78 are blocked. Gated clock 84 then produces a second series of pulses in the manner previously described, and the number of pulses thus created is displayed at readout 26. Depressing a third keyboard switch creates a third series of pulses on lead 100, and displays the number of the pulses at readout 27.

The address network 24 of FIG. 1 is shown in more detail in FIG. 3. In an actual installation, the address network of FIG. 3 would be mounted together with a power supply in a control box which may conveniently be mounted in the equipment room with other telephone apparatus. Although not shown in FIG. 2, a power supply is required to supply the necessary operating voltage for the logic circuits.

Data line 100 from the pulse generating circuit just described connects to the input of inverter 109, whose output connects by lead 101 to the input of retriggerable one-shot circuit 102, and also to the inputs of NOR gates 103–105. The $\bar{Q}$ output of one-shot 102 connects to the input counter 107. A decoder 108 is connected to receive the outputs from the four stages of counter 107. The outputs of decoder 108 are connected to the other inputs of NOR gates 103–105 and to both inputs of NOR gate 106 by leads 113–116, respectively. The output of NOR gate 106 connects by lead 117 to the input of one-shot 118, whose Q output connects to a clear line 119 which is connected to the clear input of counter 107, and also to the clear inputs of counters 121 and 122. Counter 121 receives its input from the output of NOR gate 103, via lead 123, and counter 122 similarly receives its input via lead 124 from the output of NOR gate 104. Counters 121 and 122 are four stage binary counters, and their respective outputs are applied to decoders 125 and 126. Each of these decoders had 10 outputs, and provides a decimal output corresponding to the binary output of the counters.

Reference numeral 130 generally designates a NOR gate array which is connected to the outputs of decoders 125 and 126. In addition, each gate in array 130 receives as one of its inputs signals from a lead 131, which connects from the output of an inverter 132. The input of inverter 132 is connected from the output of NOR gate 105 by lead 133.

NOR gate array 130 has n outputs, numbered consecutively from 01 to n, where n equals the number of extensions in the key telephone system. In the preferred embodiment, the extension identification number is a two digit number, with the tens digit being contained in counter 121, and the ones digit in counter 122. Thus the array 130 could be designed to provide up to $n = 99$ separate outputs, but as previously mentioned telephone systems usually have less than about 25 extensions, so array 130 may be designed accordingly. Of course, if the number of extensions used is less than ten, then counter 122 would not be required. Likewise, the circuitry of FIG. 2 could be simplified by eliminating one of the counter-readouts stages.

In the preferred embodiment disclosed herein, three series of pulses are used. The first two series of pulses comprise the extension identification signal, and the third series of pulses comprises the line identification signal. The number of individual pulses in the first and second series of pulses represent, respectively, the tens and ones digit of the extension number. The function of the address network of FIG. 3 is to respond to the extension identification signals so as to steer the line identification signals to the proper extension.

Prior to the initiation of a new addressing cycle, counter 107 will have been reset to a zero count by the action of one-shot 118, described below. Decoder 108 then provides a logical "0" on lead 113, and logical "1's" on its remaining outputs. NOR gate 103 is thus enabled to transmit a first series of pulses on lead 101 via lead 123 to counter 121. The first pulse of the first series also functions to trigger one-shot circuit 102. The $\bar{Q}$ output of one-shot 102 then switches to a logical "0". Since one-shot 102 is retriggered by each individual pulse in the series, it provides a single output pulse to counter 107 for the entire series. When one-shot 102 then returns to its stable state after the series of pulses, the positive going pulse at its output on $\bar{Q}$ increments counter 107 to a count of one. Decoder 108 then enables gate 104 while inhibiting gates 103, 105, and 106. The address network is therefore in condition to receive the second series of pulses and load them into counter 122. Again, at the end of the second series of pulses one-shot 102 resumes its stable state and increments counter 107 to a count of two. Decoder 108 then enables NOR gate 105 at the exclusion of the other NOR gates, so that the third series of pulses, which is the line identification signal, is passed through NOR gate 105, lead 133, inverter 132, and line 131 to each of the NOR gates within array 130. The gate within array 130 corresponding to the number in counters 121 and 122 is enabled, allowing the line identification signals to pass through array 130 to the selected extension.

After the completion of the third series of pulses, one-shot 102 returns to its stable state incrementing counter 107 to a count of three. This enables NOR gate 106 which in turn triggers one-shot 118. One-shot 118 provides a pulse on lead 119 which serves to clear counters, 107, 121 and 122 to ready them for the next addressing cycle.

FIG. 4 shows the circuitry associated with a remote extension. In the preferred embodiment, this circuitry is built into the remote extension telephone instrument, with the readout visible through a cutout in the face of the instrument. Alternatively, a separate housing independent of the telephone instrument, and having the buzzer and readout could be used. If the latter approach is taken, the housing could be placed in the same office or other general vicinity of the remote extension to which it is addressed.

In FIG. 4, lead 140 is a data line from array 130 of FIG. 3, which corresponds to the number of the addressed extension. Lead 140 connects to the input of an optical coupler 141, the output of which connects to a lead 142. Optical coupler 141 is included to provide noise rejection and ground loop isolation which is necessary because of the long transmission lines involved from the addressing network to the remote extensions.

Lead 142 connects to one input of a NAND gate 143, and also to the input of a one-shot 144. The Q output of one-shot 144 connects to the input of a second one-shot 145. The Q output of one-shot 145 connects to the other input of NAND gate 143. The output of NAND gate 143 connects via lead 146 to the input of an inverter 147 and to the input of a one-shot 148. The Q output of one-shot 148 connects through a current limiting resistor 151 to the base of a transistor 150. The collector of transistor 150 is connected to a source of positive voltage, which for convenience may be the same voltage supply used to operate all the logic circuits of FIG. 4, which in turn is supplied by a wire from a power supply which may be mounted together with the addressing network in the equipment room. The emitter of transistor 150 connects through a buzzer 152 to signal ground.

The output of inverter 147 connects to the input of counter 153, and the reset line for counter 153 is controlled from the Q output of one-shot 145 by lead 154. The outputs from counter 153 connect to decoder 155, which in turn connects to the readout 33.

In operation, after the two pulse series of the extension identification signal have set up the proper output from the addressing network, the line identification signal is transmitted to the addressed remote extension, and is received on lead 140 (FIG. 4) at the remote extension. After coupling by optical coupler 141, the first pulse of the pulse series is applied simultaneously to NAND gate 143 and to one-shot 144. One-shot 144 is immediately triggered, and in turn triggers one-shot 145. One-shot 144 is a retriggerable one-shot, and is designed to have a relatively long ON time so that it is triggered on receipt of the first pulse in the series, but does not revert to its stable state until after the entire pulse series has been received. In contrast, one-shot 145 is designed to have a very short ON time of approximately 30 nanoseconds. The purpose of one-shot 145 is to send a fast clear pulse on lead 154 to clear counter 153, which would still contain the last received line identification signal. A 30 nanosecond logical "1" pulse on lead 154 clears the counter, then one-shot 145 returns to its stable state and supplies a logical "1" from its $\overline{Q}$ output to NAND gate 143. NAND gate 143 is thus enabled, so that it may transmit the pulses received at its other input from lead 142. Since the ON time of one-shot 145 is relatively fast compared with the duration of the individual pulses in the line identification pulse series, the clearing of the counter 153 and subsequent enabling of NAND gate 143 all takes place during the first fractional part of the first pulse of the series, so that no pulses are lost during the clearing operation.

The pulses transmitted through NAND gate 143 are inverted by inverter 147 and counted by counter 153. The number of pulses in the series of course equals the line identification number, so that at the end of the pulse series the number displayed by readout 33 is the identification number of the line which the called party is to answer.

The positive going edge of the first pulse in the series triggers one-shot 148, which then turns on transistor 150, thereby energizing buzzer 152 to provide an audible signal to alert the called party. The ON time of one-shot 148 may be selected as desired, to provide the duration of the audible signal which is desired. In the preferred embodiment, the ON time of one-shot 148 is approximately 2 seconds. Additionally, a variable resistor could be included in the circuit through transistor 150 and buzzer 152, for controlling the loudness of the audible signal as desired.

We claim:

1. Apparatus for use in conjunction with a key telephone system for handling incoming calls, comprising:

a a plurality of digital readouts each associated with an extension of said key system, said digital readouts for visual display of data indicating the line on which an incoming call is received; and b means for receiving extension and line data corresponding to an incoming call and for transmitting the line data for display by the digital readout associated with the extension corresponding to the received extension data.

2. Apparatus according to claim 1, wherein said last named means includes the dial or keyboard of one telephone of the key telephone system and means connected thereto for generating and transmitting electrical data pulses.

3. Apparatus according to claim 1, wherein said last named means includes an auxiliary dial or keyboard and means connected thereto for generating and transmitting electrical data pulses.

4. An extension and line indicating system for use in conjunction with a key telephone system for handling incoming calls, comprising:

a input means for entry of data signifying the called party's extension and the line on which the call is received;

b signal generating means operably connected to said input means, for producing in response thereto an extension identification signal and a line identification signal;

c a plurality of display means each associated with an extension telephone of said key telephone system, said display means for providing a visual indication of the telephone line corresponding to line identification signals received thereby; and d transmission means in communication with said signal generating means and said plurality of display means, for transmitting line identification signals to the display means associated with the extension corresponding to a received extension identification signal.

5. Apparatus according to claim 4, wherein said display means includes a digital readout mounted on an extension telephone of said key telephone system so that the digital readout is visible on the face of the telephone.

6. Apparatus according to claim 4 further including a plurality of audible signaling devices each associated with an extension telephone of said key telephone system, said audible signaling devices connected to said display means and operable to produce an audible signal on receipt of line identification signals.

7. Apparatus according to claim 4 further including digital display means connected to said signal generating means and associated with said input means for displaying the extension and line data for confirmation purposes.

8. A line indicating system for use in conjunction with a key telephone system for handling of incoming calls, comprising:

a input means for the entry of the number of the called party's extension and the identifying number of the line on which the incoming call is received;

b pulse generating means operatively connected to said input means for generating a first set of pulses corresponding to the called extension number and a second set of pulses corresponding to the identifying number of the line;

c a plurality of display means each associated with a separate extension of said key system and operable when addressed to visually display a received line identifying number; and d address means operatively connected to said pulse generating means and to said plurality of display means for pulse transmission therebetween, said address means for directing said second set of pulses to one of said plurality of display means associated with the extension corresponding to said first set of pulses, whereby the identifying number of the called line is caused to be displayed at the called party's extension.

9. Apparatus according to claim 8, wherein said input means comprises a dial or keyboard of one telephone of the key telephone system and switching means for alternatively connecting the dial or keyboard to a central office line or to said pulse generating means.

10. Apparatus according to claim 8, wherein said input means comprises an auxiliary dial or keyboard associated with one telephone of the key telephone system.

11. Apparatus according to claim 8 further including display means associated with said input means and connected to said pulse generating means for displaying the extension and line identifying numbers.

12. Apparatus according to claim 8 further including audible signaling devices associated with said display means for producing an audible signal when line identifying pulses are received at the extension.

* * * * *